United States Patent [19]

Denton

[11] Patent Number: 4,802,737

[45] Date of Patent: Feb. 7, 1989

[54] ANTI-RELFECTION OVERLAY DEVICE

[76] Inventor: Peter R. Denton, 33 Harrow Gate Dr., Cherry Hill, N.J. 08003

[21] Appl. No.: 856,709

[22] Filed: Apr. 28, 1986

[51] Int. Cl.$^4$ .................................. G02B 5/28

[52] U.S. Cl. .................................. 350/166; 350/164; 350/431; 428/161; 428/172; 428/428; 428/913

[58] Field of Search .............. 428/161, 172, 428, 913; 350/166, 164, 431

[56] References Cited

U.S. PATENT DOCUMENTS 4,322,125 3/1982 Warren .............................. 350/164

4,419,397 12/1983 Neat et al. .......................... 428/161

*Primary Examiner*—George F. Lesmes

*Assistant Examiner*—P. R. Schwartz

*Attorney, Agent, or Firm*—William E. Cleaver

[57] ABSTRACT

The present device is an overlay member, such as a glass piece, which permits a viewer to see, for instance a work of art, without being distracted by reflected images emanating from the overlay or glass surface. The present overlay has a base member having rough surfaces on both sides and has a coating, or plurality of layers of anti-reflection material such as silicon dioxide and titanium dioxide, which is arranged to reduce image reflection, from the surface, by light interference. The rough surfaces of the base member substantially disperse the reflecting light, which does occur after the reduction by the anti-reflection coating, so that the viewer sees no image reflection.

6 Claims, 1 Drawing Sheet

25

29

27

B

ANTI-RELFECTION OVERLAY DEVICE

BACKGROUND

It is well known that smooth surfaces, such as found on glass, plastic and metals, reflect light. The normal silvered mirror is an example of a smooth surface which has everyday usage. While the principle of light reflection is very useful in connection with mirrors, flash lights and many other pieces of apparatus, it can be a nuisance when trying to view a piece of art through an ordinary picture frame glass, or when trying to read the face of an instrument through ordinary glass. Whenever a partially transparent cover, made, for example, from glass or plastic, is placed over art work, or other surfaces such as instrument displays, the partial reflection of visible light from both the front and rear surfaces of the protective cover may interfere with the reflected light from the art work or instrument display. Such partial reflection prevents the viewer from obtaining a clear view of the subject. The effect of reflecting part of the incident light and transmitting less to the subject to be viewed has been a problem for as long as glass covers have been available. The ability of the viewer to obtain a clear and accurate assessment of the surface behind the transparent cover varies a great deal with the subject, the lighting, the position of the viewer, etc. For example, if all or part of the art work behind a glass cover is dark, it is quite possible that the light reflected from the front and back surfaces of the cover will "wipe out" part or all of the art work from the view of the observer.

In the prior art there have been at least two attempts made to mitigate the image reflection problem. The first attempt has been to employ chemically etched glass. Chemically etched glass has the advantage that there is little specular reflection and hence little image forming light. To say it another way, a viewer looking at a piece of art which has a cover piece of etched glass (hereinafter called non-glare glass) would not be troubled by the image reflection of a window located behind the viewer. However, the etched glass has the disadvantage that it does provide a diffuse reflection and the viewer, in our hypothetical case, would see a fuzziness around the work of art or a veil of light over the work of art. The second attempt, in the prior art, to reduce the image reflection has been the provision of clear layers of materials which provide by light interference an anti-reflection characteristic to the glass surface. One such material has been magnesium fluoride. In a well known anti-reflection coating arrangement, there is: a first layer of clear material whose characteristics and thickness provide a ¼ wavelength optical thickness of light; a clear second layer of material whose characteristics and thickness provide a ½ wavelength optical thickness of light; and a clear third layer of material whose characteristics and thickness provide a ¼ wavelength optical thickness of light. In the foregoing arrangement, the wavelength is assumed to be 5500 angstroms and the total thickness of the three layered coating is approximately 3200 angstroms. It should be understood that more or less numbers of layers could be employed and the thickness can be in the range of 1300 to 6500 angstroms. The components of specular reflecting light involved with such a multi-layered coating are approximately zero but not quite. The disadvantage of the anti-reflection coatings is that if such a coating is employed, there is still some image reflected light which is, however, quite reduced.

The present device employs both the technique of the roughened glass surface and the technique of the anti-reflection coating and provides a non-reflecting overlay device which is superior to either non-glare glass or non-reflective coated glass.

SUMMARY

The present device is a protective transparent overlay for protecting works of art, instrument panels and the like. The present overlay is not simply transparent but is constructed to provide virtually no image reflection to a viewer who is observing a work of art or reading information from an instrument display. The overlay device of the present invention includes a base member which has a rough surface, i.e., a surface which is formed into small hill-like protrusions with valleys lying therebetween. In a preferred embodiment the hill-like protrusions are in the order 0.75 to 1.2 microns high. In the preferred embodiment, secured to the irregular surface of the base member is a multi-layered anti-reflection coating of silicon dioxide and titanium dioxide. In a preferred embodiment, the anti-reflecting coating is secured to the irregular surfaces of the base member and generally follows the contours thereof as opposed to substantially filling in the valleys between the protrusions with the coating material. Light which is incident to the present overlay device has the effect of its specular reflective light reduced, by the non-reflective coating through which it passes. In addition, after passing through the non-reflection coating, the amount of light available for further reflection is also reduced so that when that remaining available light strikes the irregular surface of the base member it is dispersed, but its insufficiency in amount does not produce the veil of light present with non-coated, non-glare glass.

The objects and features of the present invention will be better understood by a study of the following description taken in conjunction with the drawings wherein.

It should be understood that in this description the reference to the overlay base member will be to chemically etched glass but that in fact the base member could be glass whose surface is made rough by some method other than chemically etching, such as vapor etching, mechanical abrasive roughening, fine pattern impressions into a hot, soft glass surface as well as various treatments in vacuum. It should also be understood that the base member could be plastic in which case the surfaces could be chemically etched, or could be made rough by mechanical means and different anti-reflection coatings and baking temperatures would be used.

Figure 1:
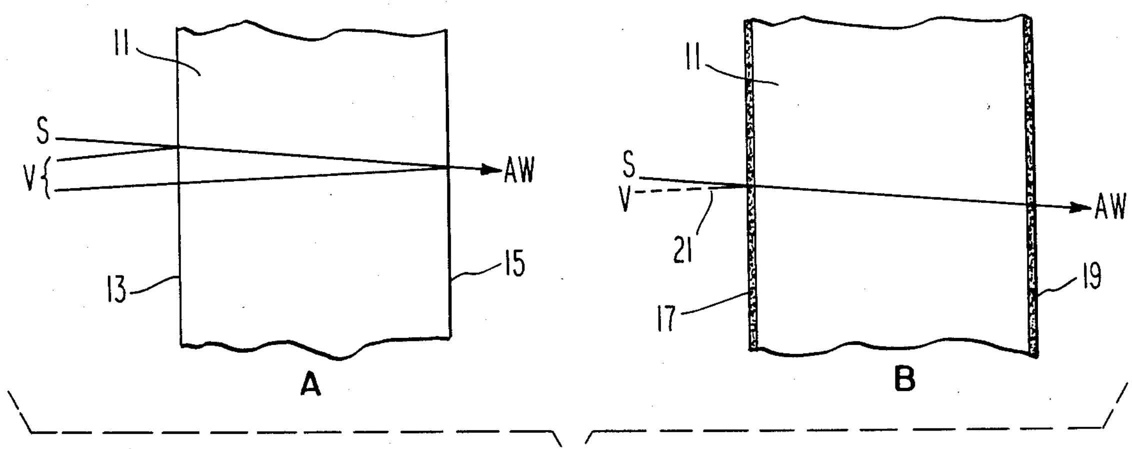
FIGS. 1A and 1B depict the cross-sectional end view of a section of a glass overlay respectively without and with an anti-reflection coating therein.

Consider FIG. 1A. In FIG. 1A there is shown (and greatly exaggerated) a section of uncoated, unetched glass ordinarily used in a picture frame. Although the glass 11 of FIG. 1A is depicted as an end view, it is not "hatched" in order not to confuse the description. If we imagine that the source (S) is a window in a room and that the glass 11 is located between the art work (AW) and the viewer (V) then we find that the light being reflected from the surface 13 as well as from the surface 15 is transmitted to the viewer. This reflected light provides an image of the window (S) to the viewer. Indeed as shown in FIG. 1A light is transmitted beyond the glass 11 to the art work (AW) and is reflected therefrom to the viewer which provides the viewer with an image of the art work (AW). It should be noted that the light from the source (S) is shown as being transmitted at an angle to enable the description to be more meaningful. The light from the source (S) which is normal to the surface of the overlay is of extreme importance in this discussion and is cast in the role of the light from the source (S) as shown. The image of the window which appears to the viewer from the reflected light from the surfaces 13 and 15 is annoying to the viewer and has given rise to the use of anti-reflection coatings such as the coating shown in FIG. 1B. It should be understood that light will be reflected from the art work thereby providing an image of the art work for the viewer although that phenomenon is not depicted in the drawings.

Figure 3:
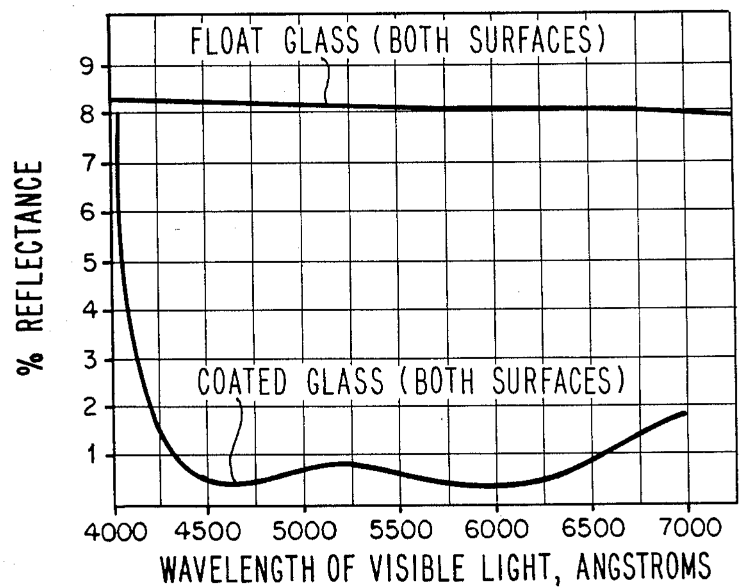
FIG. 3 depicts a relationship between percentage of light reflected and wavelength of incident light for anti-reflection coated glass.

In FIG. 1B the glass 11 is shown as being coated with an anti-reflection coating 17 on the front surface and an anti-reflection coating 19 on the back surface. As is well understood the anti-reflection coating acts to reduce the amount of specular reflection. Accordingly, as is depicted in FIG. 1B, the amount of specular reflected light returning to the viewer is relatively small. The dashed line is employed to depict the reduced amount of specular reflection. As can be seen from FIG. 3, typically, the reflections for non-coated glass is approximately 8% over the visible wavelengths of light. On the other hand as can be seen in FIG 3, the reflection for a coated glass is less than 1% over the major and critical portion of the visible light range. The disadvantage of the anti-reflection coated glass shown in FIG. 1B is that the reduced amount of reflected light 21 still provides an image of the window (S) and even though the intensity of the image from the reflective light 21 is reduced, it is nonetheless present.

Figure 2:
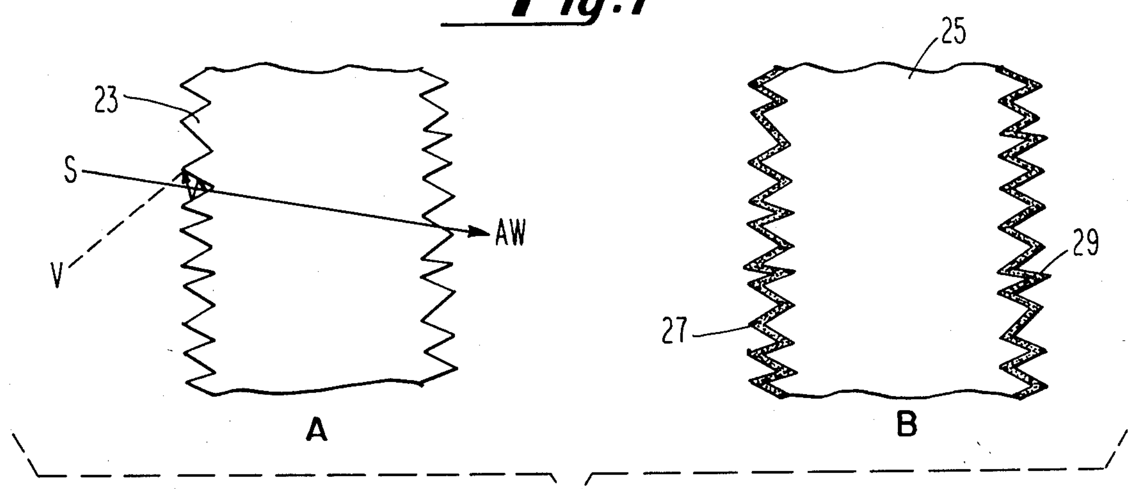
FIGS. 2A and 2B depict the cross-sectional end view of a section of etched glass respectively without and with an anti-reflection coating thereon.

In FIG. 2A there is depicted a piece of chemically etched (non-glare) glass 25. Light from the source (S) strikes the rough surface and is dispersed so that the viewer sees a veil of light and the image reflected from the art work is made somewhat fuzzy. The etched glass used with the preferred embodiment has protrusions such as protrusion 23 which are approximately 0.75 to 1.2 microns in height.

FIG. 2B depicts the make up of the present invention. In FIG. 2B there is shown a piece of etched glass 25 upon which there has been placed a coating 27 of non-reflection material on the front surface and a coating 29 of non-reflection material on the rear surface. The coatings 27 and 29 have been secured to the rough surface so as to follow the contour of the protrusions and valleys therebetween with a minimum of filling in of the valleys.

In a preferred embodiment, glass, etched in solutions containing active fluoride ions, was thoroughly washed and dried and a three layer anti-reflection coating was applied to the etched surface. In a preferred embodiment, a first layer anti-reflection material of was applied to the etched surface by dipping the etched glass in a solution depositing a mixture of silicon hydroxide and titanium hydroxide while drawing the glass therefrom at a constant rate and thereafter heating the glass in a range of 150° C. to 200° C. to simply dry the layer. Thereafter the "once coated" glass was dipped in a solution depositing substantially titanium hydroxide, drawn therefrom at a constant rate and heated in a range of 150° C. to 200° C. to dry the second layer. Finally the "twice coated" glass was dipped in a solution depositing substantially silicon hydroxide, drawn therefrom at a constant rate, and heated in a range of 150° C. to 200° C. to dry the third layer. Thereafter the "thrice coated" glass was baked in a temperature range of 430°–460° C. to solidify the coating and transform the silicon to silicon dioxide and the titanium to titanium oxide. The three layered coating produced gives the glass anti-reflection characteristics as shown in FIG. 3. It should be understood that while the present description deals with silicon dioxide and titanium dioxide, other materials such as zirconium oxide, tantalum oxide and magnesium fluoride have been used.

The draw times were chosen so that the multi-layered coating followed the general anti-reflective configuration of $\frac{1}{4}$ wavelength for the first layer, $\frac{1}{2}$ wavelength for the second layer and $\frac{1}{4}$ wavelength for the third layer. The three layers varied in refractive index with the first being 1.89, the second layer being 2.1 and the third layer being 1.45. It should be understood that other refractive indices could be employed.

I found that if the etched glass were coated as described above that a vastly improved non-reflection overlay is produced. I believe that the improvement results from the arrangement of the layer of anti-reflection coating over the surface of the etched glass. Unexpectedly the deposited anti-reflection coating resulted in very little filling of the valleys but instead substantially followed the contours of the rough surface. In addition I believe that the heretofore unrecognized reduction of the amount of light (through the anti-reflection coating) available for dispersion by the rough surface of the etched glass is a factor in the improved overlay. In other words the advantage of reducing the specular reflection by employing anti-reflection coatings has been well known and the improvement in light transmission through the base member in response to employing an anti-reflection coating has been well understood. However, I believe that the anti-reflection coating reduces the amount of light available for further reflection and when that reduced amount of light is dispersed by the rough surface of the etched glass there is neither specular reflection nor disperson reflection transmitted back to the viewer.

I claim:

1. A transparent overlay means to permit light to be transmitted to an object to be viewed, which overlay means provides protection for said object to be viewed and provides for reducing light reflection as seen by a viewer, comprising in combination:

a transparent glass base member having a refractive index and having a depth dimension and having first and second surfaces lying on opposite sides of said depth dimension, said first and second surfaces being roughened surfaces with a plurality of hill-like protrusions and a plurality of valleys lying therebetween, whereby light which is incident thereto is partially transmitted therethrough and partially dispersed to reduce image light reflection as seen by a viewer; and transparent anti-reflection coating secured to both said first and second surfaces in such a manner as to follow said hill-like protrusions, said anti-reflection coating having a refractive index and thickness which provides a light interference phenomenon to light which is incident to said overlay means whereby image light reflection from light incident to said overlay means is reduced by both said light interference phenomenon and by light being partially dispersed.

2. An overlay means according to claim 1 wherein said transparent glass base member is chemically etched glass.

3. An overlay means according to claim 1 wherein said anti-reflection coating has a thickness in the range of 1300 to 6500 angstroms.

4. An overlay means according to claim 1 wherein said anti-reflection coating comprises three layers respectively having the approximate configuration of ¼ wavelength, ½ wavelength, and ¼ wavelength wherein said wavelength approximates 5500 angstroms.

5. An overlay means according to claim 1 wherein said anti-reflection coating comprises a first layer consisting of a mixture of silicon dioxide and titanium oxide, a second layer of substantially titanium dioxide, and a third layer of substantially silicon dioxide.

6. An overlay means according to claim 1 wherein said hill-like protrusions are in the order of 0.75 to 1.2 microns high.

* * * * *